(No Model.)

F. A. GURNEY.
CLAMP FOR WIRE TIGHTENERS.

No. 269,497. Patented Dec. 19, 1882.

Witnesses,  
Henry Frankfurter, per F. F. Warner  
J. B. Halpenny

Inventor,  
Frank A. Gurney.  
his Attorney

N. PETERS, Photo-Lithographer, Washington, D. C.

UNITED STATES PATENT OFFICE.

FRANK A. GURNEY, OF CHICAGO, ILLINOIS.

CLAMP FOR WIRE-TIGHTENERS.

SPECIFICATION forming part of Letters Patent No. 269,497, dated December 19, 1882.

Application filed May 10, 1882. (No model.)

*To all whom it may concern:*

Be it known that I, FRANK A. GURNEY, of Chicago, county of Cook and State of Illinois, have invented certain new and useful Improvements in Clamps for Wire-Tighteners, of which the following, in connection with the accompanying drawings, is a specification.

Figure 1:
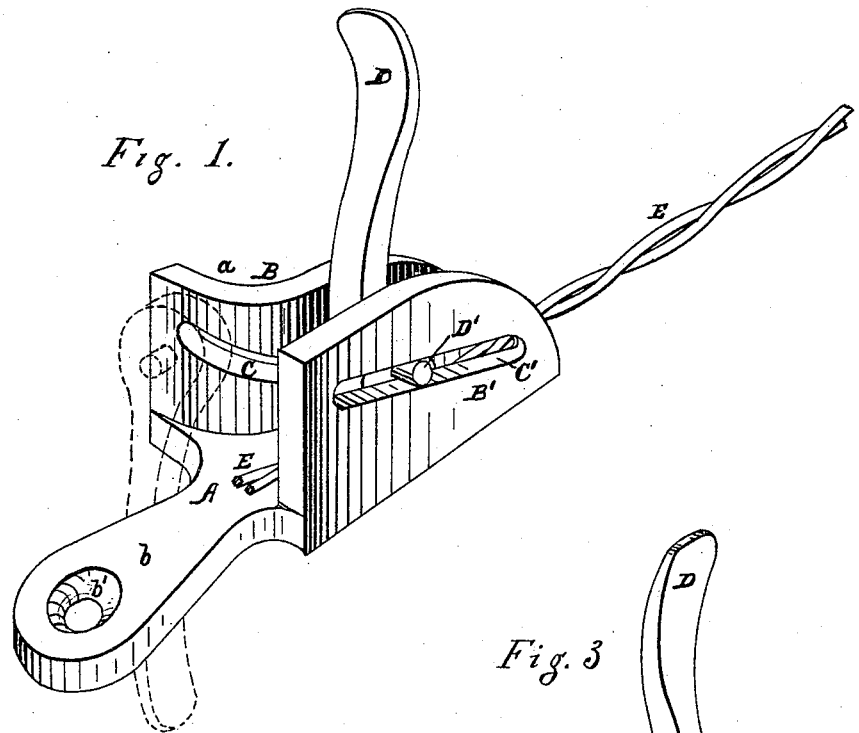
Figure 3:
Figure 2:
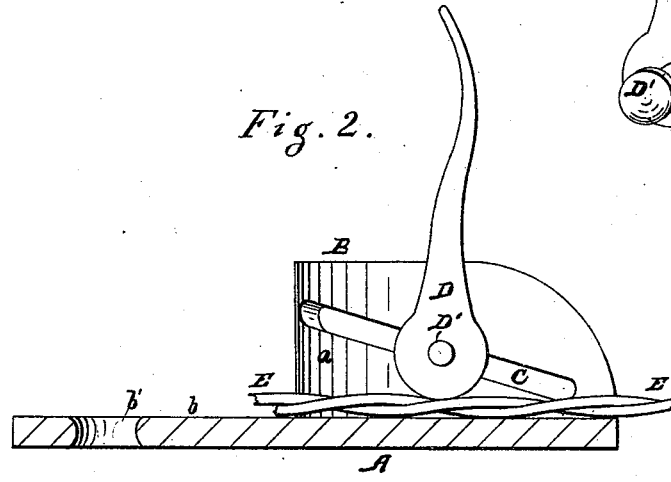

In the drawings, Figure 1 is a perspective representation of a clamp embodying my invention. Fig. 2 is a vertical central longitudinal section thereof, and Fig. 3 is a detail of the lever.

Like letters of reference indicate like parts.

A represents a metallic plate, and B B' are vertical flanges or wings on each side of the plate A. The flange B is bent or curved outwardly or laterally at one end, as indicated at $a$.

C is a slot in the wing B, and C' is a slot in the wing B'. These slots are directly opposite each other, and extend from end to end of the wings, as shown. The plate A projects some ways from the wings B B', thus forming a tongue, $b$, in which is a hole or opening, $b'$. The slots C C' are inclined, being highest at the ends nearest the tongue $b$, as shown.

D is a lever, and D' is a headed pin or bolt passing through the lower end of the lever D and through the slots C and C'. The lower end of this lever is in the form of a circle having the axial center of the pin D' for a center.
The pin D' is cylindrical, and headed only on one end, and that end moves in the slot C, the head of the pin being just outside of the said slot. The other end of the pin D' enters and moves in the slot C'. By this means the lever D may be moved back and forth between the wings B and B', and while being so moved it will also move up and down or to and from the plate A, owing to the inclination of the slots in which the pin D' moves. The lever D may also be moved to the extreme forward or curved end of the slot C, in which case the pin D' will be drawn out of the slot C'. The lever D will then be retained in connection with the wing B by means of the head of the pin D'; but it is not absolutely essential, though preferable, that it should then be retained in connection therewith. This forward position of the lever D is indicated by the dotted lines shown in Fig. 1. The space between the wings B and B' is then fully open or unobstructed.

This device may be used for various purposes, and is particularly serviceable as a clamp for use in connection with fence-wire tighteners and similar uses. To connect the clamp with a wire-tightener I link it thereto by means of a link or other suitable connection entering the hole $b'$. To clamp the wire I arrange the latter between the wings B and B', as indicated in Figs. 1 and 2, wherein E represents a wire cable of two twisted strands, such as is commonly used in the construction of barbed-wire fences. It will be perceived that the wire may be so arranged with facility, as the space between the wings B and B' is wholly unobstructed. It will also be perceived that the clamp may be easily arranged upon any part of a continuous or unbroken wire, as the clamp may be arranged below the wire and then raised until the wire occupies the position shown. To clamp the wire I raise the lever D and move it back, when the unheaded end of the pin D' will enter the slot C'. A continued back movement of the lever will bring its lower end in contact with the wire, owing to the fact that the slots are inclined, as described. If the clamp be then drawn forward the lower end of the lever will pinch the wire tightly, for the contact of the wire with the lever will then tend to draw the lever back into the lower parts of the slots, and the lower its position the tighter it will pinch the wire. The lever is free to roll, or, rather, its pin may roll in the slots.

It is not essential that the lever should occupy a vertical position while it is in contact with the wire, for its lower end, being in the form of a circle concentric with the pin, will retain its bite upon the wire in any position that the handle of the lever can then occupy.

I deem it best to make the lever long enough to be manipulated with facility; but it is not essential to its operation that it should be either cam-shaped or serrated where it is intended to be in contact with the wire.

It will be perceived also that this clamp is adapted to receive wires differing in size and single as well as twisted wires of more than one strand.

It is to be understood that the lever and its pin should be permanently connected in order to prevent the separation of the several parts; but the lever need not be absolutely inseparable from its pin.

The part A and its slotted wings may be all made in one and the same piece.

It is also obvious that the clamp will be very strong and durable, as the lever has two bearings, or one on each side. It is obvious also that the clamped wire cannot slip laterally, being confined between two high wings, and it cannot move upward out of the clamp, as the lever and its pin will prevent such movement, the pin extending, as it does, into the two slots in the wings.

This clamp may also be used with great advantage in clamping and tightening telegraph-wires while either placing or repairing them.

Having thus described my invention, what I claim as new, and desire to secure by Letters Patent, is—

A clamp device in which are combined the lever D, the straight wing B', and curved wing B, each having therein an inclined slot, and the pin D', passing through the said lever and entering the said slots and retaining the said lever movably in the wing B', substantially as and for the purpose specified.

FRANK A. GURNEY.

Witnesses:
F. F. WARNER,
H. FRANKFURTER.